United States Patent
Kritt et al.

(10) Patent No.: US 9,961,403 B2
(45) Date of Patent: May 1, 2018

(54) VISUAL SUMMARIZATION OF VIDEO FOR QUICK UNDERSTANDING BY DETERMINING EMOTION OBJECTS FOR SEMANTIC SEGMENTS OF VIDEO

(71) Applicant: LENOVO ENTERPRISE SOLUTIONS (SINGAPORE) PTE. LTD., New Tech Park (SG)

(72) Inventors: Barry A. Kritt, Atlantic Beach, NC (US); Sarbajit K. Rakshit, Kolkata (IN); Shawn K. Sremaniak, Raleigh, NC (US)

(73) Assignee: Lenovo Enterprise Solutions (Singapore) PTE., LTD., New Tech Park (SG)

( * ) Notice: Subject to any disclaimer, the term of this patent is extended or adjusted under 35 U.S.C. 154(b) by 759 days.

(21) Appl. No.: 14/166,158

(22) Filed: Jan. 28, 2014

(65) Prior Publication Data
US 2014/0178043 A1 Jun. 26, 2014

Related U.S. Application Data

(63) Continuation of application No. 13/722,754, filed on Dec. 20, 2012, now abandoned.

(51) Int. Cl.
*G06F 3/048* (2013.01)
*G06F 3/00* (2006.01)
(Continued)

(52) U.S. Cl.
CPC ..... *H04N 21/47217* (2013.01); *G06F 3/0484* (2013.01); *H04N 21/234318* (2013.01);
(Continued)

(58) Field of Classification Search
CPC .......... G06F 3/048; G06F 15/16; G06F 17/30; G06F 3/00; G06K 9/007; H04N 21/8549
See application file for complete search history.

(56) References Cited

U.S. PATENT DOCUMENTS 5,459,517 A  10/1995 Kunitake et al.
5,734,794 A  3/1998  White
(Continued)

OTHER PUBLICATIONS

Albiol et al., "The Indexing of Persons in News Sequences Using Audio-Visual Data", 2003 IEEE International Conference on Acoustics, Speech, and Signal Processing (ICAPSSP '03) Proceedings, vol. 3, pp. 137-140. DOI: 10.1109/ICASSP.2003.1199126.
(Continued)

*Primary Examiner* — Hugo Molina
(74) *Attorney, Agent, or Firm* — Jason Friday

(57) ABSTRACT

The types and locations of particular types of content in a video are visually summarized in a way that facilitates understanding by a viewer. A method may include determining one or more semantic segments of the video. In addition, the method may include determining one or more emotion objects for at least one of the semantic segments. Further, the method may include generating a user interface on a display screen. The user interface may include one window, and in another embodiment, the user interface may include two windows. Moreover, the method may include displaying first indicia of the emotion object in a first window. The horizontal extent of the first window corresponds with the temporal length of the video and the first indicia are displayed at a location corresponding with the temporal appearance of the emotion object in the video.

16 Claims, 8 Drawing Sheets

(51) Int. Cl.
  *G06F 17/30* (2006.01)
  *H04N 21/8549* (2011.01)
  *H04N 21/472* (2011.01)
  *G06F 3/0484* (2013.01)
  *H04N 21/2343* (2011.01)
  *H04N 21/266* (2011.01)
  *H04N 21/845* (2011.01)

(52) U.S. Cl.
  CPC ....... *H04N 21/266* (2013.01); *H04N 21/8456* (2013.01); *H04N 21/8549* (2013.01)

(56) References Cited

U.S. PATENT DOCUMENTS

| | | | |
|---|---|---|---|
| 6,014,183 | A | 1/2000 | Hoang |
| 6,226,793 | B1 | 5/2001 | Kwoh |
| 6,544,294 | B1 | 4/2003 | Greenfield et al. |
| 7,027,508 | B2 | 4/2006 | Shibata et al. |
| 7,380,258 | B2 | 5/2008 | Durden et al. |
| 7,738,778 | B2 | 6/2010 | Agnihotri et al. |
| 7,889,073 | B2 | 2/2011 | Zalewski |
| 7,904,814 | B2 | 3/2011 | Errico et al. |
| 8,937,620 | B1 * | 1/2015 | Teller ............... G06T 13/80 345/467 |
| 2002/0059588 | A1 | 5/2002 | Huber et al. |
| 2003/0118974 | A1 | 6/2003 | Obrador |
| 2004/0263529 | A1 | 12/2004 | Okada et al. |
| 2005/0257242 | A1 | 11/2005 | Montgomery et al. |
| 2006/0122842 | A1 * | 6/2006 | Herberger ............ G10H 1/368 704/278 |
| 2007/0129942 | A1 | 6/2007 | Ban et al. |
| 2007/0160128 | A1 | 7/2007 | Tian et al. |
| 2007/0223871 | A1 | 9/2007 | Thelen |
| 2007/0277092 | A1 | 11/2007 | Basson et al. |
| 2008/0101660 | A1 * | 5/2008 | Seo ............... G06F 17/30032 382/118 |
| 2008/0127270 | A1 * | 5/2008 | Shipman ......... G06F 17/30843 725/46 |
| 2008/0166027 | A1 | 7/2008 | Jeong et al. |
| 2008/0253617 | A1 | 10/2008 | Ernst et al. |
| 2009/0040390 | A1 | 2/2009 | Morita et al. |
| 2009/0110247 | A1 | 4/2009 | Kim |
| 2009/0153744 | A1 | 6/2009 | Morita et al. |
| 2009/0226046 | A1 * | 9/2009 | Shteyn ............... G06K 9/00711 382/118 |
| 2009/0265170 | A1 | 10/2009 | Irie et al. |
| 2010/0131993 | A1 | 5/2010 | Sanitate et al. |
| 2010/0195874 | A1 | 8/2010 | Isogai et al. |
| 2010/0251295 | A1 | 9/2010 | Amento et al. |
| 2010/0303158 | A1 | 12/2010 | Lin |
| 2010/0306671 | A1 * | 12/2010 | Mattingly ............ G06Q 10/10 715/753 |
| 2010/0325135 | A1 * | 12/2010 | Chen ............... G06F 17/30053 707/759 |
| 2011/0093798 | A1 | 4/2011 | Shahraray et al. |
| 2012/0216121 | A1 * | 8/2012 | Lin ................. H04N 21/23432 715/721 |
| 2012/0323575 | A1 * | 12/2012 | Gibbon ................ G11B 27/28 704/246 |
| 2013/0124996 | A1 * | 5/2013 | Margulis ............. G06F 3/0484 715/719 |
| 2013/0132088 | A1 * | 5/2013 | Kim .................... A61B 5/165 704/270 |
| 2013/0166587 | A1 * | 6/2013 | Berry ............... G06F 17/30038 707/769 |
| 2013/0204664 | A1 | 8/2013 | Romagnolo et al. |
| 2013/0246063 | A1 * | 9/2013 | Teller ................. G10L 13/033 704/235 |
| 2013/0290846 | A1 * | 10/2013 | Calhoun .......... G06F 17/30023 715/719 |
| 2014/0172848 | A1 * | 6/2014 | Koukoumidis ... G06F 17/30997 707/736 |

OTHER PUBLICATIONS

Cano et al., "A Review of Algorithms for Audio Fingerprinting", 2002 IEEE Workshop on Multimedia Signal Processing, Dec. 9-11, 2002, pp. 169-173.

Cohen et al., "Facial Expression Recognition From Video Sequences", 2002 ICME Proceeding, IEEE International Conference on Multimedia and Expo, vol. 2, pp. 121-124. DOI: 10.1109/ICME.2002.1035527.

Delezoide et al., "Learning Optimal Descriptors for Audio Class Discrimination", © 2003 IRCAM—Centre Pompidou.

Delezoide, B., "Hierarchical Film Segmentation Using Audio and Visual Similarity", CNRS/Ircam, Paris; CEA/LIST/LIC2M, Fontenay-Aux-Roses; France.

Haisong Gu et al., "Information Extraction From Image Sequences of Real-World Facial Expressions", Machine Vision and Applications (2005) 16: 105-115. (Received Aug. 16, 2003, Accepted Sep. 20, 2004, Published Dec. 20, 2004) © Springer-Verlag 2004. DIUL 10.1007/s00138-004-0161-6.

Hanjalic, A., "Content Based Analysis of Digital Video: Chapter 5: Affective Video Content Analysis", Springer, First Edition, pp. 143-169, © 2004 Kluwer Academic Publishers.

Hulth et al., "Automatic Keyword Extraction Using Domain Knowledge", CICLing '01: Proceedings of the 2nd International Conference on Computational Linguistics and Intelligent Text Processing, Feb. 2001, pp. 472-482, © 2001 Springer-Verlag, London, UK DOI: 10.1007/3-540-44686-9_47.

IBM, "Variable Rating-Based Playback of Audio/Video Content", IP.Com Prior Art Database, IP.Com No. IPCOM000015940D, Original Publication May 19, 2002, Electronic Publication Jun. 21, 2003. http://www.ip.com/pubview/IPCOM00001594D.

Ivanov et al., "Object-Based Tag Propagation for Semi-Automatic Annotation of Images", MIR '10: Proceedings of the International Conference on Multimedia Information Retrieval, pp. 497-506, © ACM New York, NY, 2010. DOI: 10.1145/1743384.1743471.

Kasturi et al., "Information Extraction from Images of Paper-Based Maps", IEEE Transactions of Software Engineering, vol. 14, Issue 5, May 1988, pp. 671-675. DOI: 10.1109/32.6145.

Ken et al., "Personalized Video Summarization Using Importance Score", IEICE Transactions on Information and Systems, Pt. 2 (Japanese Edition), vol. J84-D-2, No. 8, pp. 1848-1855, 2001.

Lee et al., "Audio-Based Semantic Concept Classification for Consumer Video" 2010 IEEE Transactions on Audio, Speech, and Language Processing, vol. 18, No. 6, pp. 1406-1416, Aug. 2010, © 2010 IEEE. DOI: 10.1109/TASL.2009.2034776.

Liang et al., "A Histogram Algorithm for Fast Audio Retrieval", In Proceeding of: ISMIR 2005, 6th International Conference on Music Information Retrieval, Sep. 2005, pp. 586-589, © Queen Mary, University of London.

Liang et al., "Personalized Sports Video Customization Using Content and Context Analysis", International Journal of Digital Multimedia Broadcasting, vol. 2010 (2010), Article ID 836357, (Received Sep. 2, 2009, Revised Dec. 11, 2009, Accepted Jan. 26, 2010), Hindawi Publishing Corporation. DOI: 10.1155/2010/836357.

Lie et al., "Video Summarization Based on Semantic Feature Analysis and User Preference", SUTC '08: IEEE International Conference on Sensor Networks, Ubiquitous and Trustworthy Computing, 2008, pp. 486-491. DOI: 10.1109/SUTC.2008.88.

Littlewort et al., "Dynamics of Facial Expression Extracted Automatically From Video", Image and Vision Computing 24 (2006) 615-625, (Received Dec. 1, 2004, Revised Aug. 15, 2005, Accepted Sep. 15, 2005), © 2005 Elsevier B.V. DOI: 10.1016/j.imavis.2005.09.011.

Liu et al., "A Close-Up Detection Method for Movies", Proceedings of the 2010 IEEE 17th International Conference on Image Processing, Sep. 2010, pp. 1505-1508, © 2010 IEEE. DOI: 10.1109/ICIP.2010.5652408.

Moncrieff et al., "Affect Computing in Film Through Sound Energy Dynamics", Multimedia '01: Proceedings of the 9th ACM International Conference on Multimedia, Oct. 2001, pp. 525-527, © ACM, New York, NY, 2001. DOI: 10.1145/500141.500231.

(56) References Cited

OTHER PUBLICATIONS

Moncrieff et al., "Horror Film Genre Typing and Scene Labeling Via Audio Analysis", ICME '03: Proceedings of the 2003 International Conference on Multimedia and Expo, vol. 1, pp. 193-196, Published by IEEE Computer Society, Washington D.C. © 2003.

Naghsh-Nilchi et al., "An Efficient Algorithm for Motion Detection Based Facial Expression Recognition Using Optical Flow", International Journal of Engineering and Applied Sciences 2:3 2006, pp. 141-146.

Nallapati et al., "Extraction of Key Words from News Stories", CIIR Technical Report # IR-345, Center for Intelligent Information Retrieval.

Riley et al., "A Text Retrieval Approach to Content-Based Audio Retrieval", ISMIR 2008—Session 3a—Content Based Retrieval, Categorization and Similarity 1, pp. 295-300.

Sethi et al., "A Statistical Approach to Scene Change Detection", SPIE vol. 2420, pp. 329-338, SPIE Proceedings: Storage and Retrieval for Images and Video Databases III, Feb. 2005, San Jose, CA.

Sundaram et al., "Audio Scene Segmentation Using Multiple Features, Models and Time Scales", ICASSP '00: Proceedings of the Acoustics, Speech, and Signal Processing 2000 IEEE International Conference, vol. 4, pp. 2441-2444. © 2000 IEEE Computer Society, Washington D.C. DOI: 10.1109/ICASSP.2000.859335.

Wang et al., "Automated Video-Based Facial Expression Analysis of Neuropsychiatric Disorders", Journal of Neuroscience Methods 168 (2008) 224-238. (Received Jul. 16, 2007, Revised Sep. 20, 2007, Accepted Sep. 20, 2007), © 2007 Elsevier B.V. DOI: 10.1016/j.jneumeth.2007.09.030.

Wu et al., "Facial Expression Recognition Using Gabor Motion Energy Filters", 2010 IEEE Computer Society Conference on Computer Vision and Pattern Recognition Workshops (CVPRW), pp. 42-47. DOI: 10.1109/CVPRW.2010.5543267.

Wu et al., "Multi-Layer Architectures for Facial Action Unit Recognition", Machine Perception Laboratory, University of California, San Diego.

Yang et al., "Detecting Faces in Images: A Survey", IEEE Transactions on Pattern Analysis and Machine Intelligence, vol. 24, No. 1, pp. 34-58, Jan. 2002, (Received May 5, 2000, Revised Jan. 15, 2001, Accepted Mar. 7, 2001), © 2002 IEEE.

Zhang et al., "Audio Content Analysis for Online Audiovisual Data Segmentation and Classification", IEEE Transactions on Speech and Audio Processing, vol. 9, No. 4, pp. 441-457, May 2001, © 2001 IEEE. DOI: 10.1109/89.917689.

Zhou et al., "Movie Genre Classification Via Scene Categorization", MM '10: Proceedings of the International Conference on Multimedia, pp. 747-750, Oct. 2010, © 2010 ACM, New York, NY.

Unknown, "Automatic Image Annotation", Wikipedia, last modified Nov. 27, 2012. en.wikipedia.org/wiki/Automatic_image_annotation.

Unknown, "Step Function", Wikipedia, last modified Sep. 18, 2012. en.wikipedia.org/wiki/step_function.

Kritt et al., "Visual Summarization of Video for Quick Understanding", U.S. Appl. No. 13/722,754, filed Dec. 20, 2012.

* cited by examiner

VISUAL SUMMARIZATION OF VIDEO FOR QUICK UNDERSTANDING BY DETERMINING EMOTION OBJECTS FOR SEMANTIC SEGMENTS OF VIDEO

CROSS-REFERENCE TO RELATED APPLICATIONS

This application is a continuation of co-pending U.S. patent application Ser. No. 13/722,754, filed Dec. 20, 2012. The aforementioned related patent application is herein incorporated by reference in its entirety.

FIELD

This disclosure relates generally to graphical user interfaces, and more particularly, to visually summarizing a video in a way that facilitates quick understanding by a viewer of the types and locations of particular types of content.

BACKGROUND

A television show, movie, internet video, or other similar content may be stored on a disc or in other memory using a container or wrapper file format. The container format may be used to specify how multiple different data files are to be used. The container format for a video may identify different data types and describe how they are to be interleaved when the video is played. A container may contain video files, audio files, subtitle files, chapter-information files, metadata, and other files. A container also typically includes a file that specifies synchronization information needed for simultaneous playback of the various files.

One format for digital video files is the DVD-Video format. Another format for digital video files is Audio Video Interleaved ("AVI"). Audio may be stored in various formats, such as the PCM, DTS, MPEG-1 Audio Layer II (MP2), or Dolby Digital (AC-3) formats.

A multimedia video generally includes a large amount of perceptual information, i.e., information such as images and sounds that are perceived by viewers. The frames of a video file may show humans, who may or may not be actors, and a wide variety of nonhuman objects. A nonhuman object may be a background, such as a natural indoor or outdoor location, or a professional stage or set. A nonhuman object may also be a prop or other visual element in front of the background object. Yet another type of nonhuman object that may be shown in a video frame is text. For instance, words spoken by humans may be displayed as text in a particular area of the frames. Segments of an audio file may be synchronously played with the display of video frames. These segments may include spoken words, music, and a wide variety of sound effects.

While an audio-video file may be as short as a few minutes, the typical video, such as a television show or a full length movie, ranges in length from 20 minutes to over two hours. The typical video may include many scenes, each corresponding with a particular segment of the video. For example, a movie may have between 50 and 200 scenes. A minor scene may be one minute or less. A major scene may be three or more minutes. Each scene may include many frames and may include one or more camera shots. A scene may be accompanied by spoken dialog, a particular musical score or set of sound effects, or a combination of sound types. Particular human and nonhuman objects may appear in a scene. A scene may be intended by the creator to invoke particular emotions or moods, or to convey a theme of the story.

SUMMARY

One embodiment is directed to a method that visually summarizes the types and locations of particular types of content in a video in a way that facilitates understanding by a viewer. The method may include determining one or more semantic segments of the video. In addition, the method may include determining one or more emotion objects for at least one of the semantic segments. Further, the method may include generating a user interface on a display screen. The user interface may include one window, and in another embodiment, the user interface may include two windows. Moreover, the method may include displaying first indicia of the emotion object in a first window. The horizontal extent of the first window corresponds with the temporal length of the video and the first indicia are displayed at a location corresponding with the temporal appearance of the emotion object in the video.

Additional embodiments are directed to a non-transitory computer-readable storage medium having executable code stored thereon to cause a machine to perform a method for rendering a summary of a video, and to a system that visually summarizes the types and locations of particular types of content in a video in a way that facilitates understanding by a viewer.

DETAILED DESCRIPTION

Figure 1:
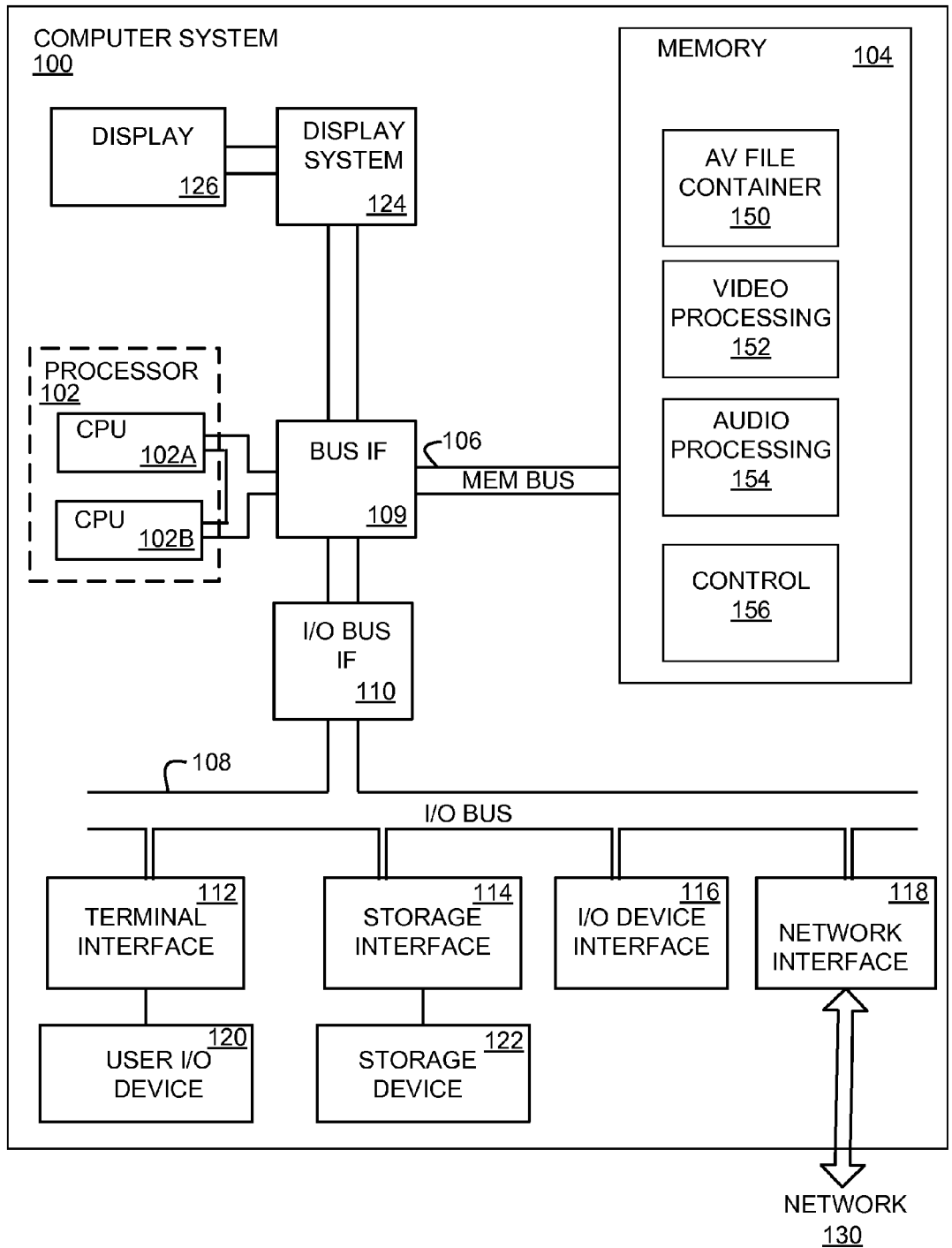
FIG. 1 depicts a high-level block diagram of an exemplary computer system for implementing various embodiments.

A multimedia video generally includes a large amount of perceptual information, i.e., information such as images and sounds that may be perceived by viewers. For example, a video may show human and nonhuman objects. A video may include spoken words, music, and other sounds, which may be referred to herein as audio objects. A video may evoke various emotions, moods, or themes, which may be referred to herein as emotion objects. The spoken words may include "key words." A key word may be a word that provides significant information content about a scene in a video. These objects and key words may be used to describe a scene to a viewer. In particular, according to various embodiments, visual representations of key words, and human, nonhuman, audio, and emotion objects may be used to describe the scenes of a video to a viewer. In addition, visual representations of the relationships between these objects and key words may be used to describe the scenes of a video to a viewer. By visually presenting this information to the viewer, he or she may be enabled to generally understand the scene. The information may enable the viewer to determine whether a particular scene is of interest or is objectionable. In various embodiments, visual information summarizing all of the scenes of a video may be presented to the viewer in a single display screen.

According to various embodiments, a viewer selects a video, and human, nonhuman, and audio objects of the video are identified. In addition, key words that are spoken by human objects in the video are identified. Human, nonhuman, and audio objects may be used to classify a particular segment of a video as a scene. The objects and key words are then associated with the scenes of the video. Further, the objects, key words, and other data may be used to determine an emotion, mood, or theme for one or more of the scenes, and to generate corresponding emotion objects. The objects and key words may be compared with profile information to determine an attitude or preference of a viewer regarding the scenes of the video. A viewer's attitude may be, for example, that he or she likes, dislikes, or finds a particular type of content objectionable. In various embodiments, visual representations of key words, and human, nonhuman, and audio objects summarizing all of the scenes of a video are presented to the viewer in a single display screen. In addition, visual representations of a viewer's attitudes or preferences toward a particular object or key word may be displayed.

In one embodiment, a display screen may include a first window for playing the video and a second window for rendering text, symbols, and icons corresponding with human, nonhuman, audio, and emotion objects, and key words. The second window may also include a visual indication of a viewer's attitude regarding particular human, nonhuman, audio, and emotion objects, and key words. In one embodiment, a viewer may select one or more scenes for playing in the first window. One or more other scenes of the video may be identified as scenes to be recommended to the viewer. The recommended scenes may be other scenes that have human, nonhuman, audio, and emotion objects, and key words that are similar to the scene selected by the viewer.

FIG. 1 depicts a high-level block diagram of an exemplary computer system 100 for implementing various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In an embodiment, the computer system 100 may contain multiple processors typical of a relatively large system; however, in another embodiment, the computer system 100 may alternatively be a single CPU system. Each processor 102 executes instructions stored in the memory 104 and may include one or more levels of on-board cache.

In an embodiment, the memory 104 may include a random-access semiconductor memory, storage device, or storage medium (either volatile or non-volatile) for storing or encoding data and programs. In another embodiment, the memory 104 represents the entire virtual memory of the computer system 100, and may also include the virtual memory of other computer systems coupled to the computer system 100 or connected via a network. The memory 104 is conceptually a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the following: an audio visual file container 150 (shown in FIG. 2 as container 202), a video processing module 152, an audio processing module 154, and a control module 156. These modules are illustrated as being included within the memory 104 in the computer system 100, however, in other embodiments, some or all of them may be on different computer systems and may be accessed remotely, e.g., via a network. The computer system 100 may use virtual addressing mechanisms that allow the programs of the computer system 100 to behave as if they only have access to a large, single storage entity instead of access to multiple, smaller storage entities. Thus, while the audio visual file container 150, video processing module 152, audio processing module 154, and control module 156 are illustrated as being included within the memory 104, these components are not necessarily all completely contained in the same storage device at the same time. Further, although the audio visual file container 150, video processing module 152, audio processing module 154, and control module 156 are illustrated as being separate entities, in other embodiments some of them, portions of some of them, or all of them may be packaged together.

In an embodiment, the video processing module 152, audio processing module 154, and control module 156 may include instructions or statements that execute on the processor 102 or instructions or statements that are interpreted by instructions or statements that execute on the processor 102 to carry out the functions as further described below. In another embodiment, the video processing module 152, audio processing module 154, and control module 156 are implemented in hardware via semiconductor devices, chips, logical gates, circuits, circuit cards, and/or other physical hardware devices in lieu of, or in addition to, a processor-based system. In an embodiment, the video processing module 152, audio processing module 154, and control module 156 may include data in addition to instructions or statements.

The video processing module 152 may include various processes that generate visual tags according to one embodiment. The audio processing module 154 may include various processes for generating audio and key word tags according to one embodiment. The control module 156 may include various processes for visually summarizing a video in a way that facilitates quick understanding by a viewer of the types and locations of particular types of content according to an embodiment. In addition, the control module 156 may include various processes for rendering all or selected portions of a video, and rendering a user interface, such as the one shown in FIG. 4. Further, the control module 156 may include various processes for identifying scenes to be recommended to a viewer, as well as other processes described herein.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering frames of video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board a processor 102 integrated circuit. In addition, one or more of the functions provided by the bus interface unit 109 may be on board a processor 102 integrated circuit.

The I/O interface units support communication with a variety of storage and I/O devices. For example, the terminal interface unit 112 supports the attachment of one or more viewer I/O devices 120, which may include viewer output devices (such as a video display device, speaker, and/or television set) and viewer input devices (such as a keyboard, mouse, keypad, touchpad, trackball, buttons, light pen, or other pointing device). A viewer may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks.

Although the computer system 100 shown in FIG. 1 illustrates a particular bus structure providing a direct communication path among the processors 102, the memory 104, the bus interface 109, the display system 124, and the I/O bus interface unit 110, in alternative embodiments, the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 is intended to depict the representative major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
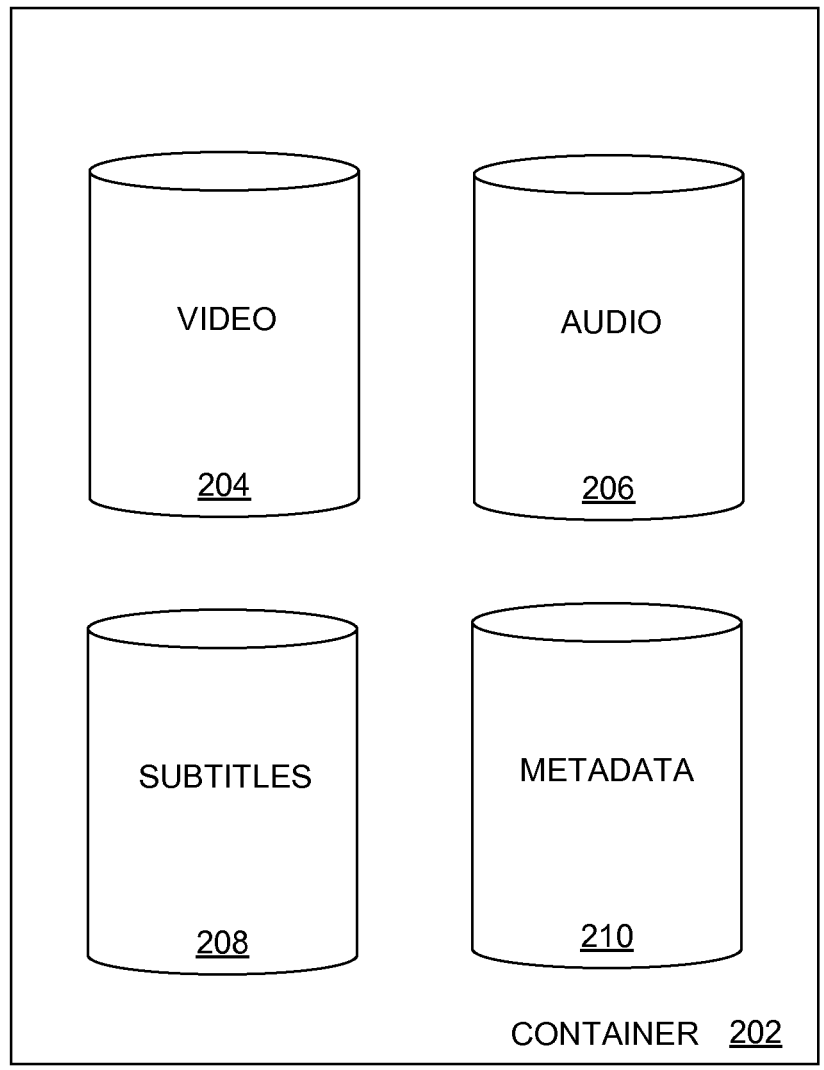
FIG. 2 is a block diagram of an exemplary audio-visual file container according to one embodiment.

FIG. 2 is a block diagram of an exemplary audio-visual file container 202 that may contain a video file 204, an audio file 206, a subtitle file 208, and a metadata file 210 according to one embodiment. The container may also include other files, such as a file that specifies synchronization information.

Figure 3:
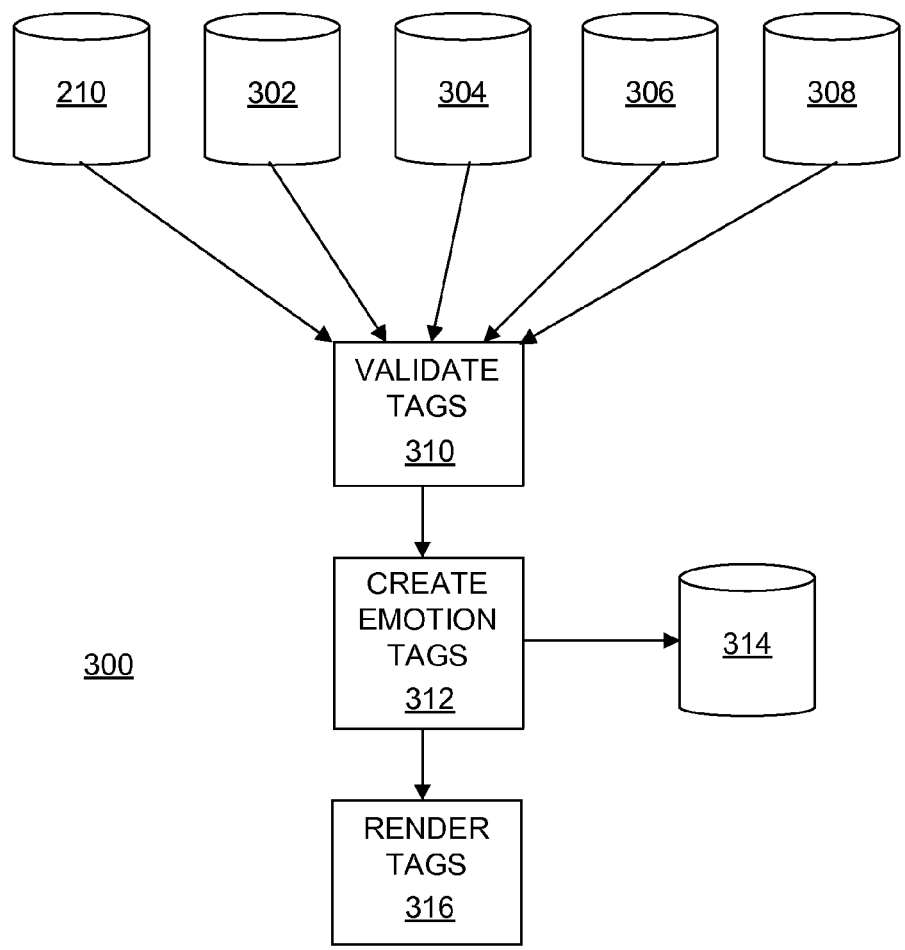
FIG. 3 is a block diagram of a process for visually summarizing a video in a way that facilitates quick understanding by a viewer of the types and locations of particular types of content according to an embodiment.

FIG. 3 is a block diagram of a process 300 for visually summarizing a video in a way that facilitates quick understanding by a viewer of the locations of particular types of content according to an embodiment. The process 300 may receive as input a visual tag file 302, an audio tag file 304, a key word tag file 306, an attribute tag file 308, and a metadata file 210. The visual tag file 302 includes tags that correspond with visually perceivable objects, such as human and nonhuman objects. The audio tag file 304 includes tags that correspond with aurally perceivable objects. The key word tag file 306 includes tags that correspond with key word objects. The attribute tag file 308 includes tags that correspond with attribute objects. Each tag may be associated with a time stamp that indicates the start and stop time in which the object or attribute is rendered or otherwise associated. Exemplary embodiments for automatically determining tags are described below with reference to FIGS. 5-6. In addition, in some embodiments, tags of one or more types may be wholly or partially determined using manual methods.

The operation 310 may include comparing a tag with one or more other tags associated with the same shot or scene for consistency. A shot may be a continuous sequence of frames captured without interruption by a camera oriented in a single direction or camera angle. As one example, a visual tag may indicate that a particular human object appears in a shot and a key word tag identifying the name of the human object is associated with the shot. As another example, a visual tag may indicate that a particular human object appears in a shot and an audio tag identifies an audio signature of the human object is associated with the shot. In these examples, if the tags that are compared indicate the same object, the positive or consistent result of the comparison may be used in operation 310 to validate that the human object was correctly identified. If there are no tags that are consistent with a particular tag, it may be determined that the object associated with the particular tag was misidentified. The operation 310 may include modifying a tag determined to be inconsistent with other tags associated with the same shot. The modification may include adding an indication to the tag that it should not be used in other processes. Alternatively, if a probability or confidence parameter associated with the particular tag is above a threshold, it may be determined that the object was correctly identified and that the shot or scene includes multiple objects. In this circumstance, the modification may include adding an indication to the tag that it may be relied on to a particular extent.

In operation 312, an emotion tag file 314 may be created from the attribute tag file 308 and the consistency-corrected visual tag 302, audio tag 304, key word tag 306, and metadata 210 files. The emotion tag file 314 includes tags that are associated with emotion objects. In one embodiment, an emotion object may be associated with an emotion, mood, or theme that a typical viewer might be expected to perceive or that the creators of a video intended the audience to perceive. Each emotion object may be of a predefined type and associated with a time stamp. An emotion object may include parameters corresponding with intensity of the perceived emotion or a confidence level that the perceived emotion accurately represents a ground truth emotion. An emotion object may be generated directly from the attribute file 308, such as where the attribute file identifies an association or correlation of an attribute with a perceived emotion. In addition, an emotion object may be generated directly from the visual tag 302, such as where the tag identifies a human object displaying a particular emotion. Further, an emotion object may be generated directly from the audio tag 304 or key word tag 306 files, such as where an audio tag identifies a segment of sound associated or correlated with an emotion, mood, or theme, or a key word is associated with an emotion, mood, or theme. Moreover, an emotion object may be generated in operation 312 by identifying patterns of visual, audio, key word, and attribute tags that correspond or correlate with an emotion object. Further, an emotion object may be generated in operation 312 using contextual data provided in the metadata file 210, such as metadata designating that the video is of a particular genre, e.g., comedy, horror, drama, or action. For example, visual, audio, and attribute tags for a shot or scene may all be associated with a particular mood, e.g., amusement, fear, sadness, suspense, or interest. In one embodiment, an emotion object may be determined using manual methods. In one embodiment, a tag may be generated for an emotion object. An emotion tag may include an intensity level of the emotion, mood, or theme. In addition, in one embodiment, a single emotion tag may be associated with two or more emotion objects. For example, a typical viewer might be expected to simultaneously perceive two emotions, such as happiness and surprise, when perceiving a particular scene. In a rendering operation 316, one or more tags of the tag files 302, 304, 306, 308, and 314 may be rendered as one or more indicia on a display device according to known techniques.

Figure 4:
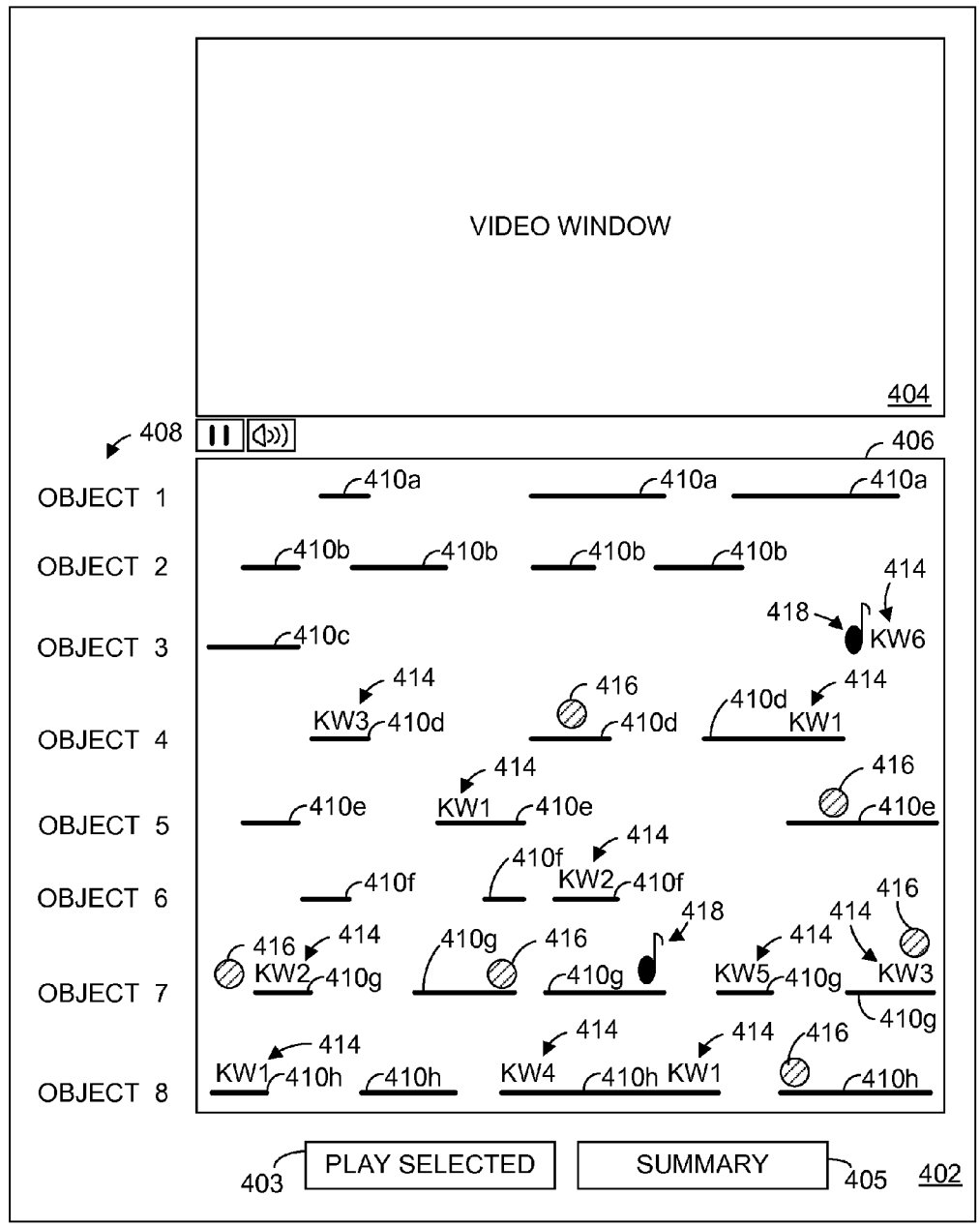
FIG. 4 depicts a display screen displaying a user interface according to one embodiment.

FIG. 4 depicts a display screen 402 of a display device, e.g., display 126 (FIG. 1), for displaying a user interface. In one embodiment, the user interface includes windows 404 and 406, which may be rendered on the display screen 402 along with a variety of textual information, and control icons or buttons, e.g., buttons 403, 405, outside of the windows. The video may be played in the window 404. A variety of text, symbols, lines, and icons ("indicia") for summarizing the video may be rendered in the window 406. The horizontal extent of the window 406 may correspond with the duration or total time of the video. The x axis shown in the figure represents the horizontal extent or time, while the y axis represents a vertical direction. While FIG. 4 depicts a user interface that includes a window 404 for playing a video, in other embodiments, a user interface may omit the window 404, i.e., in other embodiments, a user interface may include only the window 406 for rendering text, symbols, and icons for summarizing the video (along with control icons or buttons 403, 405 outside of the window 406).

In one embodiment, one or more object identifiers 408 may be rendered on the display screen 402, such as to one side or the other of the window 406, e.g., OBJECT 1 to OBJECT 8. In various embodiments, one or more horizontal lines (time lines) having a length (or horizontal extent) and temporal position may be rendered horizontally adjacent to each object identifier. The length or horizontal extent may indicate the duration of the rendering of the associated object. In FIG. 4, for instance, OBJECT 1 is associated with lines 410a and OBJECT 5 is associated with lines 410e. In the example, it can be seen that OBJECT 1 appears from time t3 to time t4, from time t5 to time t6, from time t7 to time t8. In contrast, OBJECT 3 appears from time t1 to time t2 and does not appear again. In one embodiment, an icon rather than a line may be rendered to indicate the temporal location of an object. For example, an icon 418 may be displayed to show where an audio object associated with music is located. In embodiments where an icon is rendered to indicate the temporal location of an object and the horizontal extent of the icon is smaller than the duration of the rendering of the object, the icon may be rendered at a point corresponding with the start of the time period in which the object is rendered. Alternatively, the icon may be rendered at a point corresponding with the midpoint or end of the time period in which the object is rendered. Exemplary embodiments for automatically determining object identifiers are described below with reference to FIGS. 5 and 6. It will be appreciated that the horizontal lines 410a-410h facilitate a quick understanding by a viewer of the types and locations of various objects in the video. In addition, a viewer may quickly understand where different objects simultaneously appear in the video. For example, OBJECTS 4 and 5, which may be two particular actors, only appear together in the final quarter of the video. Further, a viewer may quickly understand where preferred or objectionable objects appear in the video. For example, horizontal lines for objectionable objects may be rendered in a different color than the color used for horizontal lines for objects generally.

Still referring to FIG. 4, in various embodiments, key words 414 ("KW#") may be rendered in the second window 406 at horizontal locations corresponding with the temporal rendering of the particular key word in the video. For example, in FIG. 4, it may be seen that key word 1 (KW1) 414 appears in the video at the start, at approximately the one-third time point, at approximately the two-thirds time point, and at a time point about eighty percent of the way through the video. A key word 414 may be rendered at any desired vertical coordinate or position within the second window 406, i.e., it may but need not be associated with one of the object identifiers 408. Exemplary embodiments for automatically determining key words are described below with reference to FIG. 6. It will be appreciated that the display of key words 414 facilitates a quick understanding by a viewer of the types and locations of various key words in the video. In addition, a viewer may quickly understand where key words simultaneously occur with the appearance of various objects in the video. For example, key word KW4 occurs simultaneously with an appearance of object 8.

In various embodiments, as shown in FIG. 4, emotion, mood, or theme denoting icons 416 may be rendered in the second window 406. An emotion denoting icon 416 may be associated with and representative of an emotion tag. An emotion denoting icon 416 may be rendered at horizontal locations corresponding with the temporal location of the particular emotion tag in the video. In one embodiment, an emotion or mood denoting icon 416 may be an "emoticon." In other embodiments, an emotion or mood denoting icon 416 may be a colored or gray-scale icon. While depicted as circular, an icon 416 may be any shape. In various embodiments, the size, color, or shade of an icon 416 may correspond with an intensity of the associated emotion tag. For example, an icon 416 associated with amusement or a funny mood may be relatively large if the mood or emotion would be expected to be perceived intensely, but the same icon may be relatively small if the mood or emotion would be expected to be perceived mildly. It will be appreciated that the display of emotion denoting icons 416 facilitates a quick understanding by a viewer of the types and locations of various emotions, moods, or themes in the video. A viewer can determine in a single view the proportion of the video that is associated with a particular emotion, mood, or theme, such as action or comedy. In addition, a viewer can determine in a single view where emotion objects of a particular type are located, e.g., funny portions of the video.

Figure 5:
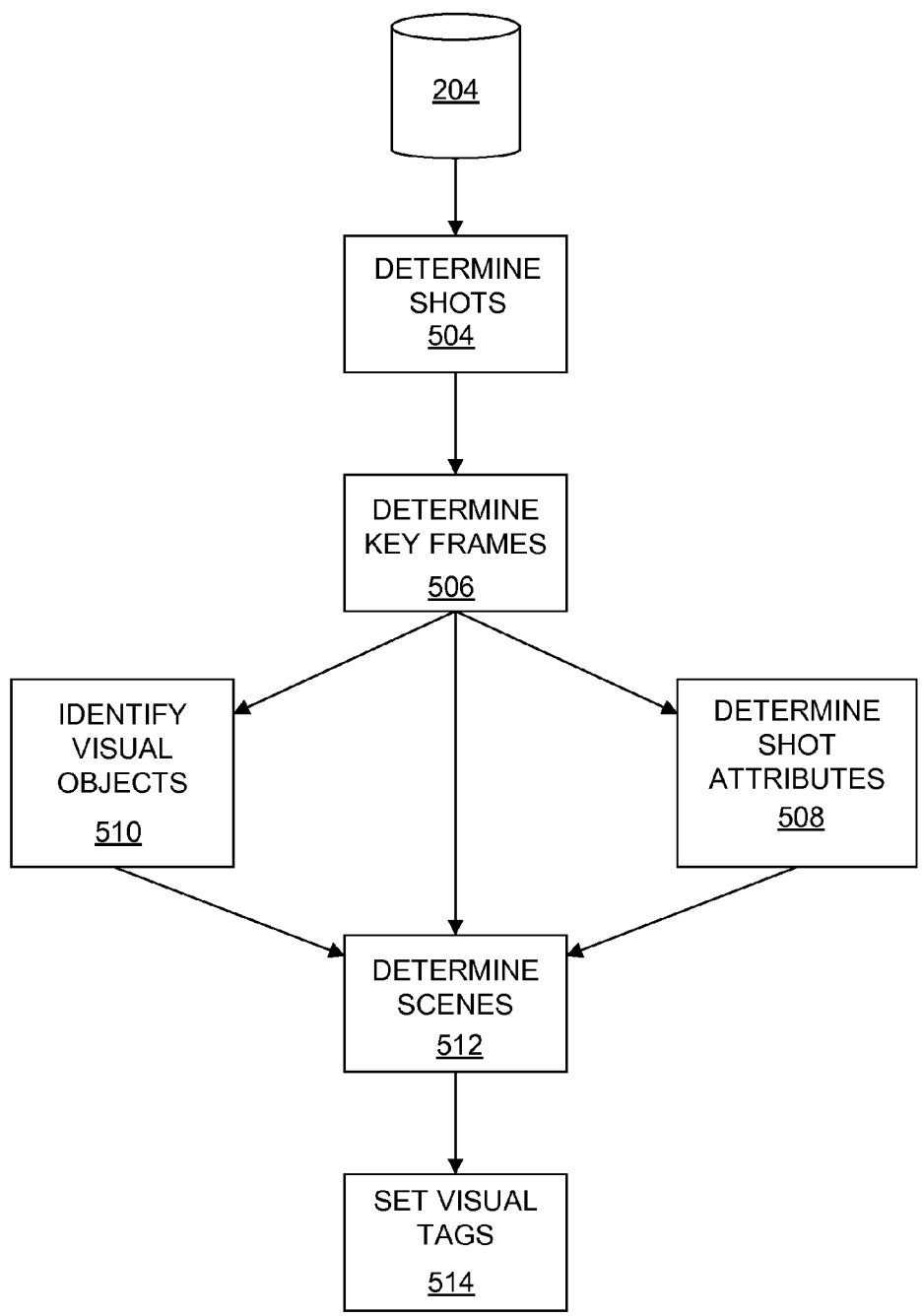
FIG. 5 illustrates one embodiment of a process for generating visual tags according to one embodiment.

FIG. 5 illustrates of a process for generating visual tags according to one embodiment. Referring to FIG. 5, in operation 504, a video file 204 may be parsed into shot files. As mentioned, a shot may be a continuous sequence of frames captured without interruption by a camera oriented in a single direction or camera angle. During a shot, the camera may have a single field of view and field size, or may have a variable field of view, such as a zoom-in -out shot. The camera may remain fixed, or be moved in a panning, tilting, or tracking motion. For example, a fixed field of view shot may be a long shot, a full shot, a medium shot, or a close up shot.

The video file 204 may be parsed into shot files according to any known method. For example, in one embodiment, a histogram may be computed for each frame of the video file and the histograms for consecutive frames compared. If the histogram intersection of first and second consecutive frames is greater than a threshold, it may be inferred that the frames are similar, and consequently that the two frames are part of the same shot. On the other hand, if the histogram intersection of first and second consecutive frames is less than the threshold, it may be inferred that the two frames form a shot boundary. In addition, it may be inferred that the first consecutive frame is the last frame of a preceding shot and the second consecutive frame is the first frame of a succeeding shot. In one alternative, the histograms of two or more consecutive first frames may be compared with the histograms of two or more consecutive second frames (the group of first and second frames being consecutive), and a shot boundary may be defined by more consecutive frames than merely two frames. For example, the shot transition between shots may be a "fade" rather than a "cut." A time code and type of shot transition (fade or cut) may be recorded as metadata for use in content analysis described below. Other known methods for parsing a video file into shot files may be employed in operation 504. In addition, operation 504 may include parsing the video file so that sequential frames between determined shot boundaries are grouped together or otherwise identified or tagged as being associated with a particular shot. Sequential frames associated with a particular shot may be referred to herein as a shot file.

In operation 506, a key frame may be determined for a shot file. The key frame may be deemed to be representative of all frames in the shot, permitting descriptive data for the shot to be determined only for the key frame and not for every frame of the shot. In one embodiment, a key frame may be determined for each shot file. In another embodiment, the operation 506 of determining a key frame may be omitted. Any known method for determining a key frame may be employed. In one embodiment, a key frame may be determined by selecting a middle frame of the shot file. In alternative embodiments, descriptive data for the shot may be determined for each of two or more key frames for a shot. Other known methods for determining a key frame may be employed in operation 506.

In operation 508, various shot attributes may be determined and recorded as metadata. Examples of shot attributes may include shot length, color variance, type of illumination or lighting, amount of motion, and shot type (zooming, panning, tilting, tracking motion, long, full, medium, or close up). Shot length may be determined by counting the number of frames of a shot. Color variance and illumination or lighting properties may be determined by analyzing pixel values of key frames using known techniques. The amount of motion may be determined by evaluating the number of times individual pixels change value from frame-to-frame in a shot using known techniques. Shot type may be determined using known techniques. A shot attribute may correspond with known cinematic techniques for evoking a particular mood. For example, particular lighting may be used to evoke a suspense theme. Metadata for a shot may include mood, emotion, or theme where another shot attribute is associated with a known cinematic technique for evoking the mood, emotion, or theme.

In operation 510, visual objects in a shot may be identified and tagged. In one embodiment, visual objects in a shot may be identified by application of one or more known image recognition processes to the shot. The operation 510 may operate on one or more key frames of the shot. A shot may include the human and nonhuman visual objects. Both human and nonhuman visual objects may be identified in operation 510. With respect to human visual objects, in one embodiment, a human visual object may be identified by identifying a face ("human facial object") in a frame. The operation 510 may include determining whether or not a particular visual object is present in a shot and, if present, to identify its location in the frame. The operation 510 may include extracting an identified object for further processing. For example, an extracted human facial object may be further processed to determine the identity of the viewer or to determine a facial expression of the viewer.

In operation 510, the position or location within a frame of an object may be determined using any known method. For example, a method may be of a type that employs rules that code typical attributes of the object. Attributes of a facial object may include, for example, eyes, eye brows, nose, hair line, hair texture, lips, and mouth. For instance, in the case of a human facial object, a rule may identify a face only if a particular facial feature, e.g., a first eye, is in a prescribed relationship to another feature, e.g., a second eye. In addition, a method may be of a type that employs rules that identify so-called "invariant features" that are present in a frame regardless of the position or pose of the object, the lighting, or camera viewpoint. Methods of this type, especially when employed to identify a human facial object, may employ an image recognition processes that identifies: (i) facial features using edge detectors (e.g., a Sobel filter) and templates; (ii) skin or hair texture using a neural network; and (iii) skin color using a pixel chrominance classifier. Further, methods may employ multiple techniques in stages, such as identifying global features such as skin color and face shape first, then verifying that the region is in fact a face by locating and detecting particular facial features within the region.

Further, once the position within a frame of an object is determined, the object may be identified as an object of a particular type or instance using any known method in operation 510. Continuing the example of a human facial object, known template matching methods may be employed. In a first type of template matching method, several standard patterns of a face are used. The standard patterns may describe the face as a whole or the facial features separately. Correlations between an image extracted from a frame and the standard patterns may be computed. If the correlations are statistically significant, it may be determined that a human facial object is found. In a second type of template matching method, the patterns are "learned" from training images using known statistical analysis and machine learning techniques. In various embodiments, patterns may be learned from training images using: (i) Eigenfaces; (ii) Distribution-based Methods (including Principle Component Analysis, Factor Analysis, and Fisher's Linear Discriminant); (iii) Neural Networks; (iv) Support Vector Machines; (v) Sparse Network of Winnows (SNoW); (vi) Naive Bayes Classifiers; (vii) Hidden Markov Models; (viii) Information-Theoretical Approaches (including Kullback relative information); and (ix) Inductive Learning Algorithms.

While methods for object location and identification have been described with respect to a human facial object, it will be appreciated that these techniques may be generally employed with non-facial human objects and nonhuman objects. For example, a nonhuman object, such as a prop may be identified though color values and object-specific features. Patterns and templates for nonhuman objects will be different than those for facial objects. For example, a musical instrument, such as an acoustic guitar, may be identified by determining regions of pixels having wood color values. Appropriately colored pixel regions may then be compared with patterns or templates for neck and body parts of the acoustic guitar, as viewed in different orientations.

In one embodiment, a human facial object may be processed to determine the emotion expressed on the facial object. To determine the emotion of a facial object, a process may, in one embodiment, employ a Gabor filter to determine facial features and their orientation, and a support vector machine to determine an emotion corresponding with detected facial features. In one embodiment, a sequence of frames in which a facial expression morphs from one emotion to another may be analyzed to determine an emotional category of a human facial object. The sequence of frames need not include every consecutive frame, e.g., two or more key frames may be analyzed. The sequence of frames may be analyzed using a Tree-Augmented-Naive Bayes classifier. In addition, a category of emotion may be determined by comparing motion vectors with a template. The motion vectors may be based on deformation of facial features as reflected in an optical flow that occurs in a sequence of frames. Optical flow may be determined using differential, matching, energy-, or phase-based techniques. In various embodiments, motions that may be determined may include amusement, joy, anger, disgust, embarrassment, fear, sadness, surprise, and a neutral state. Other emotions or moods may be determined in alternative embodiments. The operation 510 may include associating a determined emotion with a human object. In addition, the operation 510 may include generating an emotion tag that is associated with the scene of the video in which the facial emotion was detected. In other embodiments, the emotion of a facial object may be determined in operation 510 using any known method.

While the amount of motion in a shot may be determined in operation 508, in one embodiment, the amount of motion in a shot may be determined in operation 510 after identifying an object. For example, the position of the identified object in various key frames between the beginning and ending frames of the shot may be compared.

Another type of nonhuman object that may be determined in operation 510 may be a background, such as such indoor or outdoor location set. A background nonhuman object may be determined using known techniques, including techniques that consider the size (number of pixels), color, and distribution of pixels in a frame. A background object may be identified using a pattern matching technique that employs patterns or templates of various background objects. Training images for developing a template may be learned from training images in the video or in a metadata file. In other embodiments, a background object may be determined in operation 510 using any known method.

According to an aspect, a segment of two or more video frames that includes common objects, that is intended to convey common emotional content, that is intended to convey an element of a story, that is accompanied by a common audio segment, or some combination of the foregoing may be classified as a scene. A scene may also be referred to in this description and the claims as a "semantic segment." One or more of the various tags described herein may be associated with a particular scene or semantic segment if the particular tag is determined from content in the scene.

In operation 512, a visual scene may be determined according to any known method. A visual scene may include one or more camera shots and one or more human and nonhuman objects. In one embodiment, scenes may be determined by grouping together consecutive shots having visual or audio objects corresponding with the same ground truth. For example, two consecutive shots having the same background object or other non-human object may be grouped together as a scene. As another example, a scene may include a first shot that is a long shot of a particular person and a second shot that is a medium shot of the same person. As a third example, a sequence of four consecutive shots in which the first and third shots have a first human object and the second and fourth shots have a second human object may be grouped together as a scene.

In one embodiment, visual scenes may be determined if a preceding and following shot include related visual objects. For example, the first shot may include a particular person, the second shot may include another person, and two may be interacting. In one embodiment, visual scenes may be determined by comparing histogram data. For example, histogram data for a first of three consecutive shots is compared with the third shot in the series. If the intersection of first and third consecutive shots is outside a threshold, it may be inferred that the shots are similar and part of the same scene, such as where the video shows an interaction between person A and person B, the camera first capturing person A, second capturing person B, and third capturing person A.

The determination of a visual scene in operation 512 may include associating the scene with a probability or confidence parameter that is a measure of how likely the identified and grouped shots define a scene according to a ground truth specifying the temporal boundaries of a scene. In one embodiment, the validity of a scene determined in operation 512 may be tested by comparing the temporal span of the scene with other scene determiners, such as a temporal span associated with an audio object.

The determination of a visual scene in operation 512 may include associating an attribute tag with the scene. The attribute tag may correspond with known cinematic techniques for evoking a particular mood, e.g., amusement, fear, sadness, suspense, or interest. In one embodiment, an attribute tag designating an action theme may be associated with a scene with a relatively large number of shots of short duration.

In operation 514, visual tags may be associated or set for each scene. As mentioned, a visual tag corresponds with visual objects, such as human and nonhuman objects. When a tag is generated, it may be associated with a time or time span. However, the segments of the video that correspond with the various scenes may not be known at the time a tag is generated. Operation 514 may be performed at a time when the various scenes of the video are known so that a previously generated visual tag may be associated with a particular scene.

Figure 6:
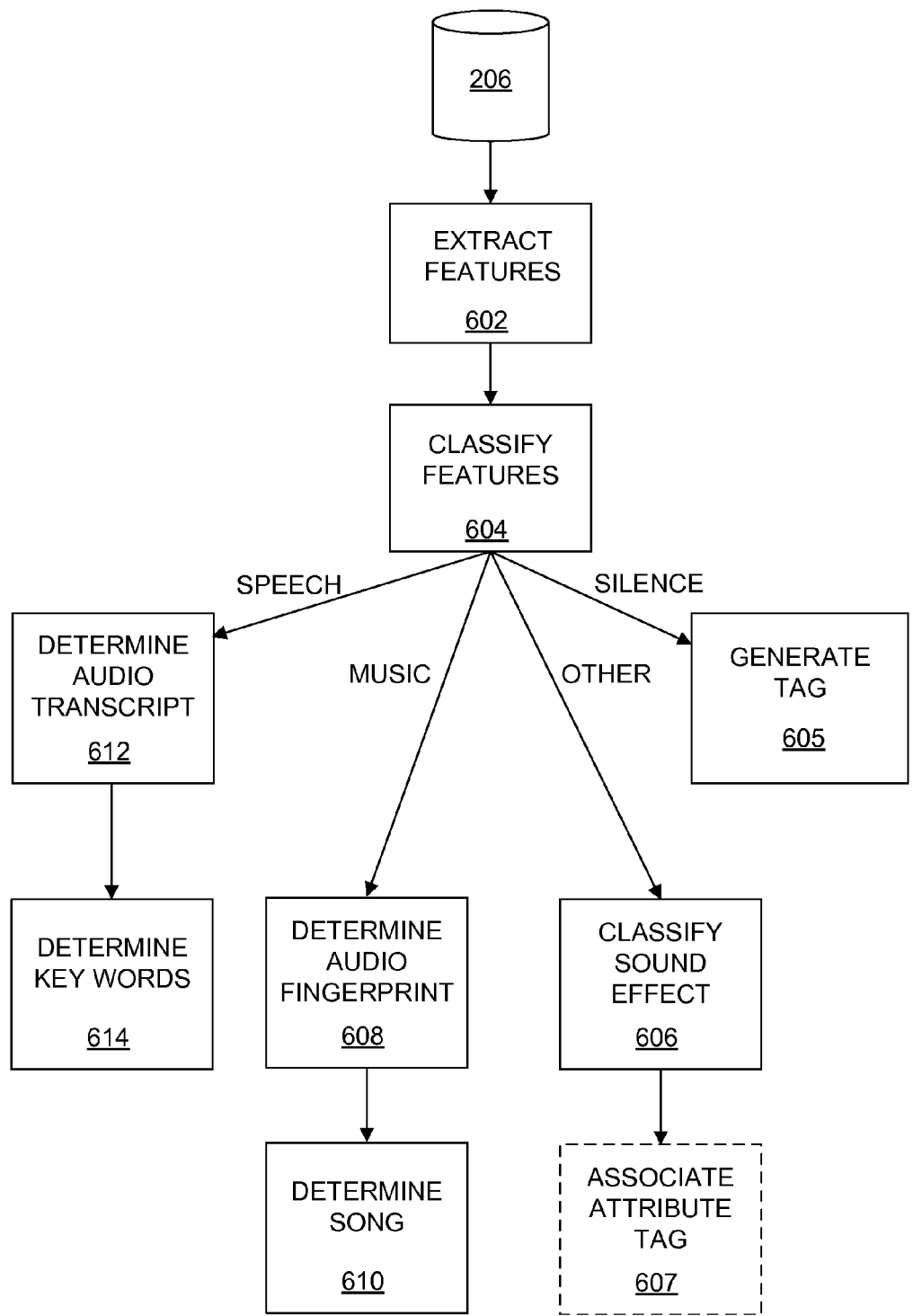
FIG. 6 illustrates a process for generating audio and key word tags according to one embodiment.

FIG. 6 illustrates a process for generating audio and key word tags according to one embodiment. Referring to FIG. 6 in operation 602, one or more audio features or audio signal descriptors may be extracted from an audio file 206. An audio feature may be a time domain feature, such as zero crossing rate, energy contour, volume contour, or fundamental frequency, or a frequency domain feature, such as short term energy, bandwidth, entropy, spectral centroid, Mel-Frequency Cepstral Coefficients, or a Discreet Wavelet Transform. Many audio features are known in the art and any known audio feature or features that are suitable may be extracted in operation 602.

In operation 604, audio features or audio signal descriptors extracted from an audio file 206 may be classified. Each classification may be defined by a set of characteristic audio feature values. In one embodiment, audio features may be classified as silence, speech (spoken words), music, and a fourth category of other sounds that will be referred to herein as "sound effect."

Segments of the video for which sound is not detectable may be classified as silent. In operation 605, an audio tag with a silent type attribute may be associated with a silent audio feature, the tag having a time stamp that indicates the start and stop time of the silent period.

Segments of the video for which the audio feature values are similar to those that are characteristic of speech may be classified as speech. An audio tag with a speech type attribute may be associated with the audio feature, the tag having a time stamp of the period of speech. Segments of the video for which the audio feature values are similar to those that are characteristic of music may be classified as music.

An audio tag with music type attribute may be associated with the audio feature, the tag having a time stamp of the period of music.

Segments of the video for which the audio feature values are not similar to those that are characteristic of speech or music (and are not silent) may be classified as a sound effect. An audio tag with sound effect type attribute may be associated with a time stamp of the period of music. The sound effect category may include sounds conventionally understood to be movie or television sound effects, such as an explosion, a door being slammed, a motor vehicle engine, a scream, laughter, applause, wind, and rain. The sound effect category may include any sound that may not be classified as speech, music, or silence, even if the sound may not be conventionally understood to be a theatrical sound effect.

In operation 606, audio features classified as sound effects may be further classified by sound effect type. Each sound effect sub-classification may be defined by a set of characteristic audio feature values. For example, a gun shot may be defined by particular audio feature values. A library of audio feature values that are characteristic of a variety of sound effects may be provided. Each audio feature classified as a sound effect may be compared with the library of characteristic features. Where matches are found, the sound effect audio tag may have additional data added to it, specifying the particular sound, e.g., a crying baby sound effect.

An optional operation 607 may include associating an attribute tag with a sound effect audio feature. The attribute tag may correspond with known cinematic techniques for evoking a particular mood. In one embodiment, an attribute tag designating an action theme may be associated with gun shot or explosion sound effects. In other embodiments, an attribute tag designating a suspense theme or amusement theme may be associated with a sound effect.

In operation 608, an audio or acoustic fingerprint may be determined for audio features classified as music. An audio fingerprint is a content-based compact signature that may summarize a music recording. In one embodiment, an audio fingerprint does correspond with an exact copy of a particular music recording. An audio fingerprint may be found to match an extracted music recording where small variations from the particular music recording are present in the extracted audio features. An audio fingerprint is derived from the extracted audio features and may include a vector, a trace of vectors, a codebook, a sequence of Hidden Markov model sound classes, a sequence of error correcting words, or musically meaningful high-level attributes.

A library of audio fingerprints for various music recordings may be provided. In operation 610, audio features classified as music may be compared with the library. Where matches are found, the music audio tag may have additional data added to it, specifying an identification of the particular song. In addition, an attribute tag designating an emotion, mood, or theme may be associated with a music audio tag. Particular cinematic techniques are known to employ certain types of music to evoke particular moods. In one embodiment, a music audio tag may include attribute data designating that the music is associated with action, suspense, or sad themes if the music is of a particular type.

In operation 612, an audio transcript may be determined. An audio transcript may include all of the words spoken in the video. In one embodiment, an audio transcript may be provided with the video in the form of a closed caption file included in the AV file container. In another embodiment, spoken words may be determined from audio features classified as speech using any known technique. In yet another, embodiment, spoken words may be manually determined.

In operation 614, key words may be determined from the audio transcript. A key word may be a word that provides significant information content about a scene in a video. For example, a key word may be a name of an actor that appears in a scene. A key word may be a name of a concept or idea that is central to a plot or story. For example, the word "run" may be a key word for the movie Forrest Gump. A key word may be a name of a song. A key word may be a word that is predefined to be objectionable or liked by a viewer. For example, a vulgar word may be predefined as a key word. In one embodiment, a key word may be determined from the audio transcript by counting the frequency of occurrences of words, the most frequently occurring verbs and nouns being determined to be key words. The operation 614 may include generating key word objects for each determined key word. In addition, key word tags may be created and stored in the key word tag file 306 (shown in FIG. 3).

In one embodiment, a viewing pattern of a viewer may be gathered during the viewing of various videos. Using the viewing pattern, a viewing profile for a viewer may be generated. The viewing profile may identify categories of objects the viewer prefers. In addition, a viewer may manually input content types that he or she prefers or finds objectionable.

Figure 7:
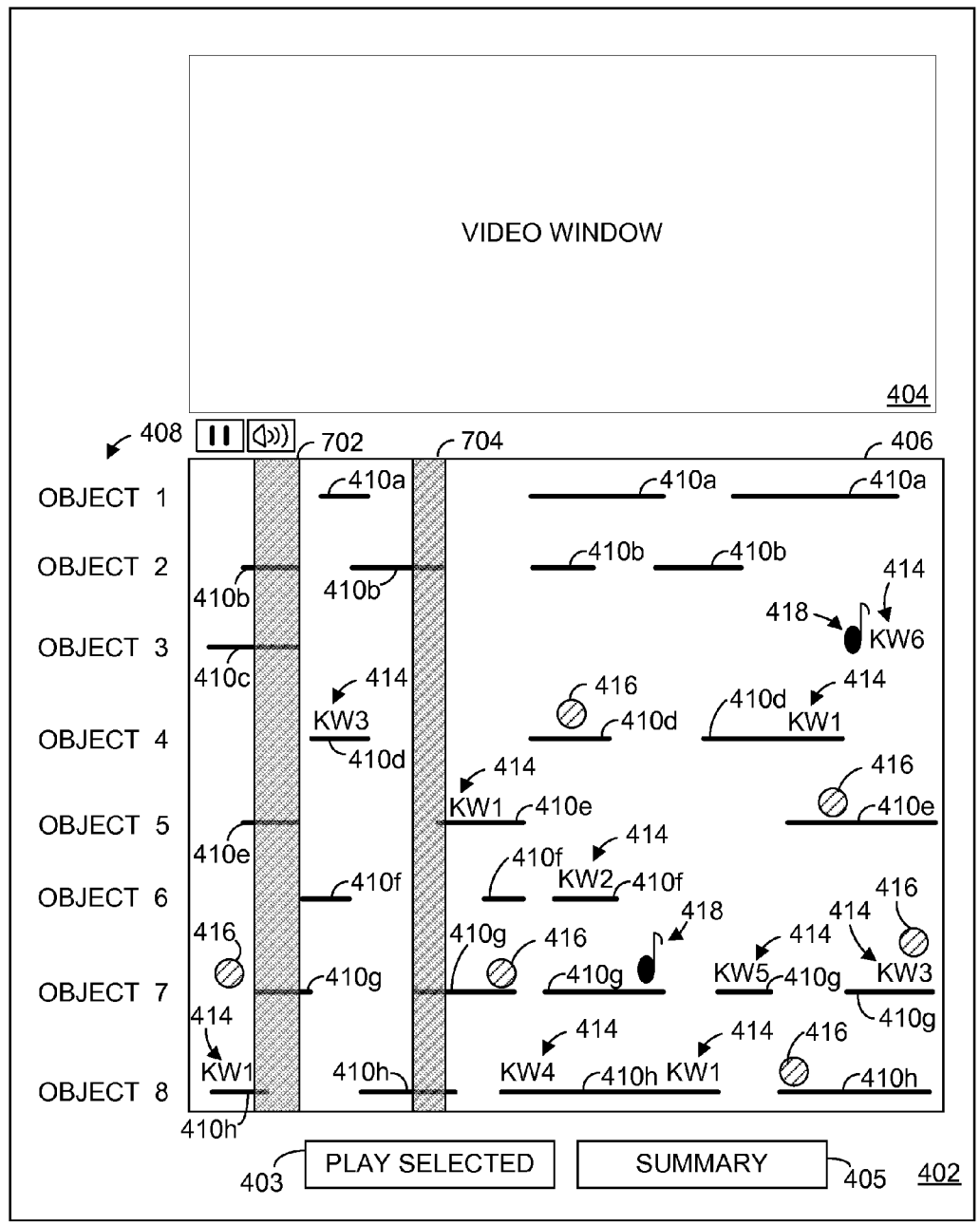
FIG. 7 depicts a display screen displaying a user interface according to an embodiment.
Figure 8:
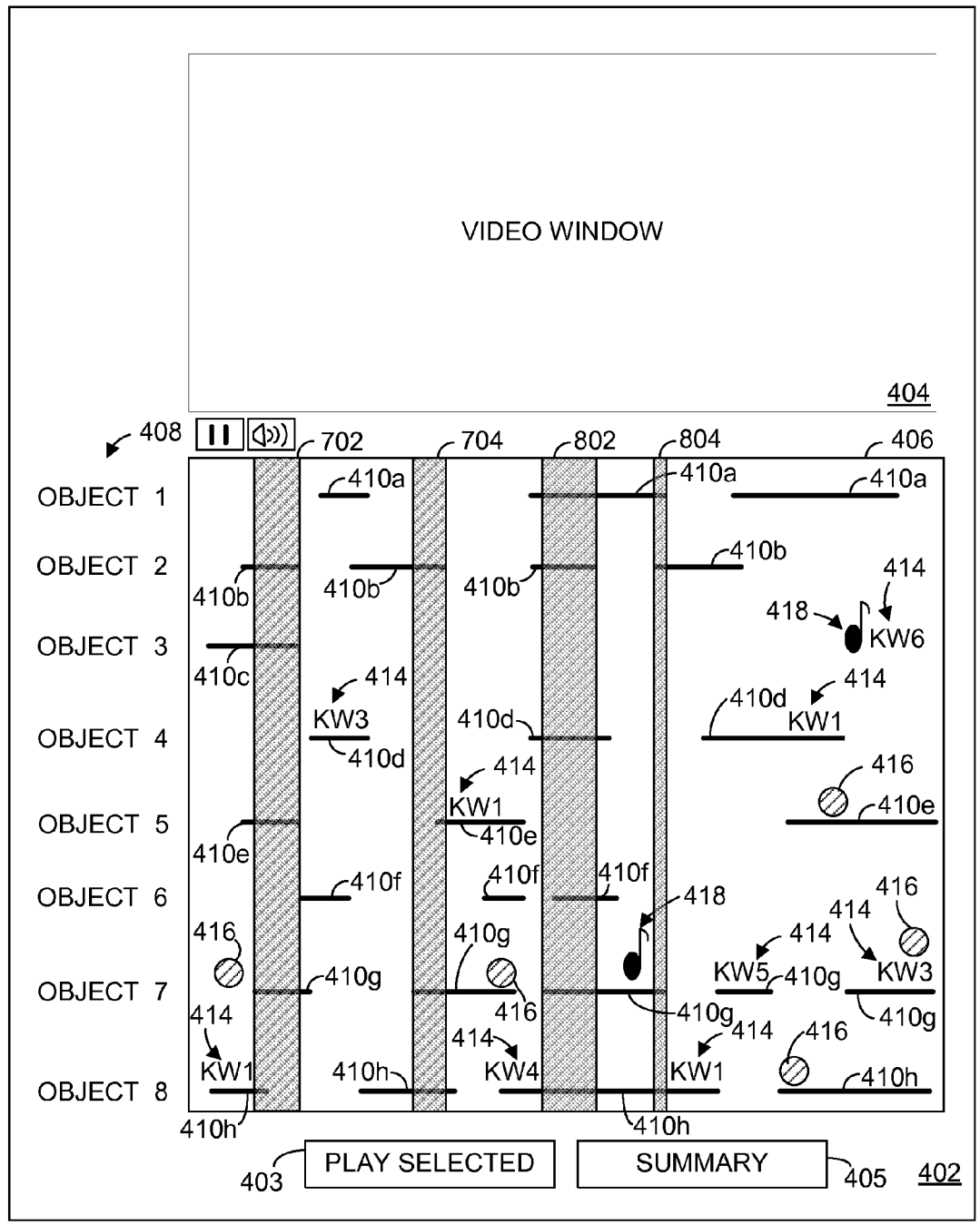
FIG. 8 depicts a display screen displaying a user interface according to an embodiment.

FIGS. 7 and 8 depict the display screen 402 for displaying a user interface according to various embodiments. In one embodiment, a viewer may select one or more time segments to create a playlist. In the example shown in FIG. 7, a viewer has selected time segments 702 and 704. In this example, the viewer desires to view a playlist that includes time segments in which both OBJECT 2 and OBJECT 7 appear. In one embodiment, a viewer may select a time segment using a pointing device, such as a mouse or a touch screen. Once a playlist has been created by a viewer, the Play Selected button 403 may be activated to play the selected time segment. In addition, in one embodiment additional time segments may be recommended to a viewer. One or more OBJECTS in the selected segments may be automatically determined or manually designated by a viewer. An automated search for any other segments that include these OBJECTS may be performed. Segments that are found to include these OBJECTS may then be recommended to a viewer. In the example of FIG. 8, the time segments 802 and 804 are recommended to a viewer. The time segments are segments in which both OBJECT 2 and OBJECT 7 appear.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the viewer's computer, partly on the viewer's computer, as a stand-alone software package, partly on the viewer's computer and partly on a remote computer, or entirely on the remote computer or server. In the latter scenario, the remote computer may be connected to the viewer's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A computer system for rendering a summary of a video, comprising:
    a processor;
    a display device having a display screen; and
    a memory communicatively coupled with the processor, the memory having instructions stored therein that, when executed by the processor, cause the computer system to:
    determine one or more semantic segments of the video having metadata indicating a type of the video;
    determine one or more visual tags, one or more audio keyword tags, and one or more attribute tags associated with the one or more semantic segments of the video, wherein the one or more visual tags, the one or more audio keyword tags, and the one or more attribute tags relates to content of the one or more semantic segments of the video;
    validate the determined one or more visual tags, the determined one or more audio keyword tags, and the determined one or more attribute tags by comparing each of the determined one or more visual tags, the determined one or more audio keyword tags, and the determined one or more attribute tags against one another for each of the determined one or more semantic segment of the video, wherein if a content identified by one of the determined one or more visual tags, the determined one or more audio keyword tags, and the determined one or more attribute tags is not identified by comparison with another of the determined one or more visual tags, the determined one or more audio keyword tags, and the determined one or more attribute tags, then the content identified by one of the determined one or more visual tags, the determined one or more audio keyword tags, and the determined one or more attribute tags is discarded from further content analysis;
    generate one or more emotion objects by identifying patterns of the determined one or more visual tags, the determined one or more audio keyword tags, and the determined one or more attribute tags that correspond or correlate with the one or more emotion object for each of the determined one or more semantic segment of the video for which the content identified by one of the determined one or more visual tags, the determined one or more audio keyword tags, and the determined one or more attribute tags has not been discarded during validation, wherein each emotion object of the generated one or more emotion objects specifies an emotion or a mood that a corresponding one or more semantic segments of the video is expected to elicit from a viewer;

generate a video summary interface on the display screen for presentation to the viewer, wherein the generated video summary interface comprises of a first window display region and a second window display region, wherein the horizontal extent of the first window display region of the video summary interface corresponds with the temporal length of a frame of the video;

display the frame of the video within the second window display region of the video summary interface;

display a timeline object within the first window display region of the video summary interface, wherein the timeline object corresponds to the temporal length of the frame of the video displayed in the second window display region of the video summary interface;

display a first indicia associated with the generated one or more emotion objects within the first window display region of the video summary interface, wherein the first indicia is displayed within the first window display region of the video summary interface at a location corresponding with the temporal position appearance of the one or more emotion object in the video;

display an audio object indicia associated with the determined one or more audio keyword tags within the first window display region of the video summary interface, wherein the audio object indicia is displayed within the first window display region of the video summary interface at a temporal location corresponding with the temporal rendering of the determined one or more audio keyword tags in the frame of the video; and display a key word object indicia associated with the determined one or more audio keyword tags within the first window display region of the video summary interface, wherein the key word object indicia is displayed within the first window display region of the video summary interface at the temporal location corresponding with the temporal rendering of the determined one or more audio keyword tags in the frame of the video.

2. The computer system of claim 1, wherein the instructions when executed by the processor further causes the computer system to determine a visual object for at least one of the determined one or more semantic segments of the video.

3. The computer system of claim 1, wherein the instructions when executed by the processor further causes the computer system to determine an audio object for at least one of the determined one or more semantic segments of the video.

4. The computer system of claim 1, wherein the instructions when executed by the processor further causes the computer system to determine a key word object for at least one of the determined one or more semantic segments of the video.

5. The computer system of claim 1, wherein the first indicia is associated with two or more emotion objects.

6. The computer system of claim 1, wherein the first indicia of the emotion object is displayed with one of a size, color, or shade corresponding to an expected intensity with which the viewer is to perceive the semantic segment.

7. A method for rendering a summary of a video, comprising:

determining, by a processor, one or more semantic segments of the video having metadata indicating a type of the video;

determining, by the processor, one or more visual tags, one or more audio keyword tags, and one or more attribute tags associated with the one or more semantic segments of the video, wherein the one or more visual tags, the one or more audio keyword tags, and the one or more attribute tags relates to content of the one or more semantic segments of the video;

validating, by the processor, the determined one or more visual tags, the determined one or more audio keyword tags, and the determined one or more attribute tags by comparing each of the determined one or more visual tags, the determined one or more audio keyword tags, and the determined one or more attribute tags against one another for each of the determined one or more semantic segment of the video, wherein if a content identified by one of the determined one or more visual tags, the determined one or more audio keyword tags, and the determined one or more attribute tags is not identified by comparison with another of the determined one or more visual tags, the determined one or more audio keyword tags, and the determined one or more attribute tags, then the content identified by one of the determined one or more visual tags, the determined one or more audio keyword tags, and the determined one or more attribute tags is discarded from further content analysis;

generating, by the processor, one or more emotion objects by identifying patterns of the determined one or more visual tags, the determined one or more audio keyword tags, and the determined one or more attribute tags that correspond or correlate with the one or more emotion object for each of the determined one or more semantic segment of the video for which the content identified by one of the determined one or more visual tags, the determined one or more audio keyword tags, and the determined one or more attribute tags has not been discarded during validation, wherein each emotion object of the generated one or more emotion objects specifies an emotion or a mood that a corresponding one or more semantic segments of the video is expected to elicit from a viewer;

generating, by the processor, a video summary interface on the display screen for presentation to the viewer, wherein the generated video summary interface comprises of a first window display region and a second window display region, wherein the horizontal extent of the first window display region of the video summary interface corresponds with the temporal length of a frame of the video;

displaying, by the processor, the frame of the video within the second window display region of the video summary interface;

displaying, by the processor, a timeline object within the first window display region of the video summary interface, wherein the timeline object corresponds to the temporal length of the frame of the video displayed in the second window display region of the video summary interface;

displaying, by the processor, a first indicia associated with the generated one or more emotion objects within the first window display region of the video summary interface, wherein the first indicia is displayed within the first window display region of the video summary interface at a location corresponding with the temporal position appearance of the one or more emotion object in the video;

displaying, by the processor, an audio object indicia associated with the determined one or more audio keyword tags within the first window display region of the video summary interface, wherein the audio object indicia is displayed within the first window display region of the video summary interface at a temporal location corresponding with the temporal rendering of the determined one or more audio keyword tags in the frame of the video; and displaying, by the processor, a key word object indicia associated with the determined one or more audio keyword tags within the first window display region of the video summary interface, wherein the key word object indicia is displayed within the first window display region of the video summary interface at the temporal location corresponding with the temporal rendering of the determined one or more audio keyword tags in the frame of the video.

8. The method of claim 7, further comprising determining a visual object for at least one of the determined one or more semantic segments of the video.

9. The method of claim 7, further comprising determining an audio object for at least one of the determined one or more semantic segments of the video.

10. The method of claim 7, further comprising determining a key word object for at least one of the determined one or more semantic segments of the video.

11. The method of claim 7, wherein the first indicia is associated with two or more emotion objects.

12. A non-transitory computer-readable storage medium having executable code stored thereon to cause a machine to perform a method for rendering a summary of a video, comprising:

determining, by a processor, one or more semantic segments of the video having metadata indicating a type of the video;

determining, by the processor, one or more visual tags, one or more audio keyword tags, and one or more attribute tags associated with the one or more semantic segments of the video, wherein the one or more visual tags, the one or more audio keyword tags, and the one or more attribute tags relates to content of the one or more semantic segments of the video;

validating, by the processor, the determined one or more visual tags, the determined one or more audio keyword tags, and the determined one or more attribute tags by comparing each of the determined one or more visual tags, the determined one or more audio keyword tags, and the determined one or more attribute tags against one another for each of the determined one or more semantic segment of the video, wherein if a content identified by one of the determined one or more visual tags, the determined one or more audio keyword tags, and the determined one or more attribute tags is not identified by comparison with another of the determined one or more visual tags, the determined one or more audio keyword tags, and the determined one or more attribute tags, then the content identified by one of the determined one or more visual tags, the determined one or more audio keyword tags, and the determined one or more attribute tags is discarded from further content analysis;

generating, by the processor, one or more emotion objects by identifying patterns of the determined one or more visual tags, the determined one or more audio keyword tags, and the determined one or more attribute tags that correspond or correlate with the one or more emotion object for each of the determined one or more semantic segment of the video for which the content identified by one of the determined one or more visual tags, the determined one or more audio keyword tags, and the determined one or more attribute tags has not been discarded during validation, wherein each emotion object of the generated one or more emotion objects specifies an emotion or a mood that a corresponding one or more semantic segments of the video is expected to elicit from a viewer;

generating, by the processor, a video summary interface on the display screen for presentation to the viewer, wherein the generated video summary interface comprises of a first window display region and a second window display region, wherein the horizontal extent of the first window display region of the video summary interface corresponds with the temporal length of a frame of the video;

displaying, by the processor, the frame of the video within the second window display region of the video summary interface;

displaying, by the processor, a timeline object within the first window display region of the video summary interface, wherein the timeline object corresponds to the temporal length of the frame of the video displayed in the second window display region of the video summary interface;

displaying, by the processor, a first indicia associated with the generated one or more emotion objects within the first window display region of the video summary interface, wherein the first indicia is displayed within the first window display region of the video summary interface at a location corresponding with the temporal position appearance of the one or more emotion object in the video;

displaying, by the processor, an audio object indicia associated with the determined one or more audio keyword tags within the first window display region of the video summary interface, wherein the audio object indicia is displayed within the first window display region of the video summary interface at a temporal location corresponding with the temporal rendering of the determined one or more audio keyword tags in the frame of the video; and displaying, by the processor, a key word object indicia associated with the determined one or more audio keyword tags within the first window display region of the video summary interface, wherein the key word object indicia is displayed within the first window display region of the video summary interface at the temporal location corresponding with the temporal rendering of the determined one or more audio keyword tags in the frame of the video.

13. The non-transitory computer-readable storage medium of claim 12, wherein the method further comprises determining a visual object for at least one of the determined one or more semantic segments of the video.

14. The non-transitory computer-readable storage medium of claim 12, wherein the method further comprises determining an audio object for at least one of the determined one or more semantic segments of the video.

15. The non-transitory computer-readable storage medium of claim 12, wherein the method further comprises determining a key word object for at least one of the determined one or more semantic segments of the video.

16. The non-transitory computer-readable storage medium of claim 12, wherein the first indicia are associated with two or more emotion objects.

\* \* \* \* \*